(12) United States Patent
Wysocki et al.

(10) Patent No.: US 10,228,874 B2
(45) Date of Patent: Mar. 12, 2019

(54) PERSISTENT STORAGE DEVICE WITH A VIRTUAL FUNCTION CONTROLLER

(71) Applicant: Intel Corporation, Santa Clara, CA (US)

(72) Inventors: Piotr Wysocki, Gdansk (PL); Mariusz Barczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/394,059

(22) Filed: Dec. 29, 2016

(65) Prior Publication Data
US 2018/0188985 A1 Jul. 5, 2018

(51) Int. Cl.
*G06F 12/08* (2016.01)
*G06F 3/06* (2006.01)
*G06F 12/0802* (2016.01)
*G06F 9/455* (2018.01)

(52) U.S. Cl.
CPC .......... *G06F 3/0622* (2013.01); *G06F 3/0659* (2013.01); *G06F 3/0685* (2013.01); *G06F 9/45558* (2013.01); *G06F 12/0802* (2013.01); *G06F 2009/45579* (2013.01); *G06F 2212/1052* (2013.01); *G06F 2212/60* (2013.01)

(58) Field of Classification Search
CPC .. G06F 3/0622; G06F 12/0802; G06F 3/0659; G06F 9/45558; G06F 3/0685; G06F 3/06
USPC .................................. 711/118, 203, 202, 206
See application file for complete search history.

(56) References Cited

U.S. PATENT DOCUMENTS

| | | | | |
|---|---|---|---|---|
| 9,047,178 | B2* | 6/2015 | Talagala | G06F 12/0246 |
| 2005/0188246 | A1* | 8/2005 | Emberty | G06F 3/0607 |
| | | | | 714/5.11 |
| 2014/0013059 | A1* | 1/2014 | Joshi | G06F 12/0815 |
| | | | | 711/144 |
| 2014/0195573 | A1* | 7/2014 | Nakagawa | G06F 17/30194 |
| | | | | 707/827 |
| 2014/0195634 | A1* | 7/2014 | Kishore | H04L 67/1097 |
| | | | | 709/213 |
| 2014/0281040 | A1* | 9/2014 | Liu | G06F 9/50 |
| | | | | 710/3 |
| 2015/0317091 | A1* | 11/2015 | Hussain | G06F 3/0688 |
| | | | | 711/103 |
| 2015/0378921 | A1* | 12/2015 | Karippara | G06F 9/45533 |
| | | | | 710/308 |

(Continued)

OTHER PUBLICATIONS

U.S. Appl. No. 14/931,730, entitled "Redundant Array of Independent Disks (RAID) Write Hole Solutions", filed Nov. 3, 2015, 56 pages.

(Continued)

*Primary Examiner* — Pierre Miche Bataille
(74) *Attorney, Agent, or Firm* — Jordan IP Law, LLC (57) ABSTRACT

An embodiment of a storage apparatus may include persistent storage media, a namespace having backend storage, and a virtual function controller communicatively coupled to the persistent storage media and the namespace to assign the namespace to a virtual storage function and to control access to the namespace by the virtual storage function. The virtual function controller may be further configured to cache access to the namespace on the persistent storage media. Other embodiments are disclosed and claimed.

18 Claims, 11 Drawing Sheets

(56) References Cited

U.S. PATENT DOCUMENTS

2017/0244259 A1* 8/2017 Tsuchiya ............. B60L 11/1812
2018/0032249 A1* 2/2018 Makhervaks ........... G06F 3/061
2018/0089101 A1* 3/2018 Sternberg ............ G06F 9/45533

OTHER PUBLICATIONS

U.S. Appl. No. 14/843,581, entitled "Technologies for Managing a Reserved High-Performance Memory Region of a Solid State Drive", filed Sep. 2, 2015, 36 pages.

U.S. Appl. No. 15/201,056, entitled "Efficient Context Based Input/Output (I/O) Classification", filed Jul. 1, 2016, 50 pages.

U.S. Appl. No. 15/258,521, entitled "Aggressive Write-Back Cache Cleaning Policy Optimized for Non-Volatile Memory", filed Sep. 7, 2016, 42 pages.

U.S. Appl. No. 15/282,478, entitled "Mass Storage Cache in Non Volatile Level of Multi-Level System Memory", filed Sep. 30, 2016, 45 pages.

U.S. Appl. No. 15/281,272, entitled "Device Driver to Provide Redundant Array of Independent Disks Functionality", filed Sep. 30, 2016, 33 pages.

U.S. Appl. No. 15/393,863, entitled "Safe Write-Back Cache Replicating Only Dirty Data", filed Dec. 29, 2016, 36 pages.

\* cited by examiner

PERSISTENT STORAGE DEVICE WITH A VIRTUAL FUNCTION CONTROLLER

TECHNICAL FIELD

Embodiments generally relate to storage media in virtualization environments.

BACKGROUND

Peripheral Component Interconnect (PCI) Express (PCIe, e.g. PCI Express Base Specification Revision 3.1a, released Dec. 7, 2015) is a high-speed serial computer expansion bus standard. Single Root Input/Output (IO) Virtualization (SRIOV, e.g. Single Root I/O Virtualization and Sharing Specification Revision 1.1, released Jan. 20, 2010) is a PCI standard to provide native IO virtualization for PCI or PCIe devices. Nonvolatile memory (NVM) EXPRESS (NVMe, e.g. NVM Express Specification version 1.2, released Nov. 3, 2014) is an optimized, high-performance scalable host controller interface designed to address the needs of enterprise and client systems that utilize PCIe-based solid-state storage. Investigating the storage performance of virtual machines for some approaches indicates that a performance bottleneck may take place. The root cause of some performance bottlenecks, for example, may be the storage software stack overhead.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. Non-limiting examples of nonvolatile memory may include any or a combination of: solid state memory (such as planar or three dimensional (3D) NAND flash memory or NOR flash memory), 3D cross point memory, storage devices that use chalcogenide phase change material (e.g., chalcogenide glass), a byte-addressable three dimensional crosspoint memory, other byte addressable write-in-place nonvolatile memory devices, such as single or multi-level Phase Change Memory (PCM), ferroelectric memory, silicon-oxide-nitride-oxide-silicon (SONOS) memory, polymer memory (e.g., ferroelectric polymer memory), ferroelectric transistor random access memory (Fe-TRAM,),), magnetoresistive random access memory (MRAM) memory that incorporates memristor technology, spin transfer torque (STT)-MRAM, ovonic memory, resistive memory, nanowire memory, electrically erasable programmable read-only memory (EEPROM), other various types of non-volatile random access memories (RAMs), and magnetic storage memory. In some embodiments, 3D crosspoint memory may comprise a transistorless stackable cross point architecture in which memory cells sit at the intersection of word lines and bit lines and are individually addressable and in which bit storage is based on a change in bulk resistance. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
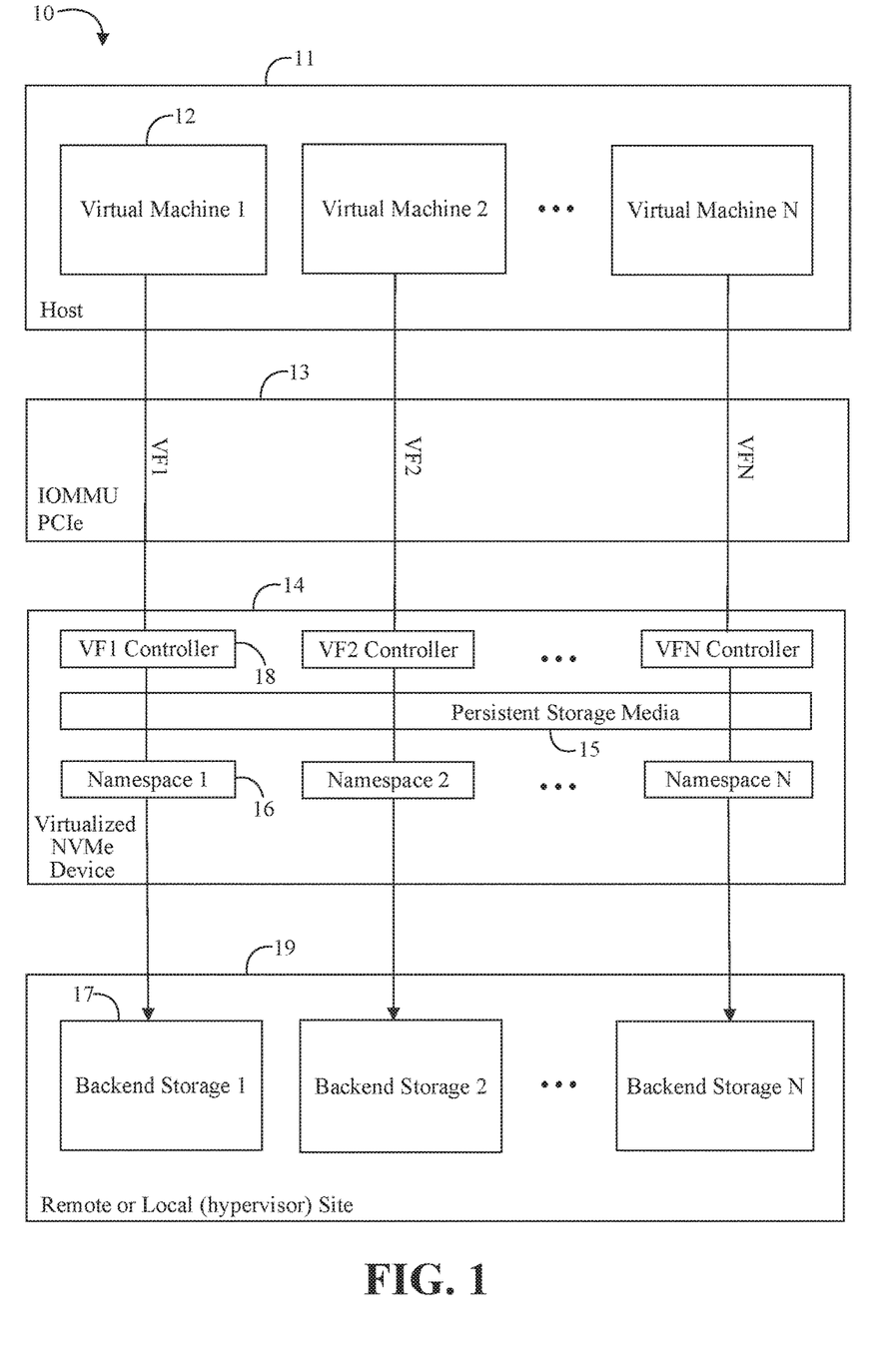
FIG. 1 is a block diagram of an example of an electronic processing system according to an embodiment.

Turning now to FIG. 1, an embodiment of an electronic processing system 10 may include a host device 11 to host one or more virtual machines 12 with one or more virtual storage functions respectively assigned to the one or more virtual machines 12, an input/output (IO) interface 13 (e.g. an IO memory management unit (IOMMU) on a PCIe interface) communicatively coupled to the host device 11 to manage IO for the one or more virtual machines 12, and a storage device 14 communicatively coupled to the IO interface 13. For example, the storage device 14 may include persistent storage media 15 (e.g. the persistent storage media 15 may comprise nonvolatile memory), one or more namespaces 16 having associated backend storage 17, and one or more virtual function controllers 18 communicatively coupled to the persistent storage media 15 and the one or more namespaces 16 to respectively assign the one or more namespaces to the one or more virtual storage functions and to control access to the namespaces 16 by the virtual storage functions. The electronic processing system 10 may further include a remote storage system 19 to provide the backend storage 17 for the one or more namespaces 16. Advantageously, in some embodiments of the electronic processing system 10 the one or more virtual function controllers 18 may be further configured to provide a cache engine to cache access to the one or more namespaces 16 on the persistent storage media 15.

Embodiments of each of the above host device 11, virtual machines 12, IO interface 13, storage device 14, persistent storage media 15, namespaces 16, backend storage 17, virtual function controllers 18, remote storage system 19, and other components of the electronic processing system 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 2:
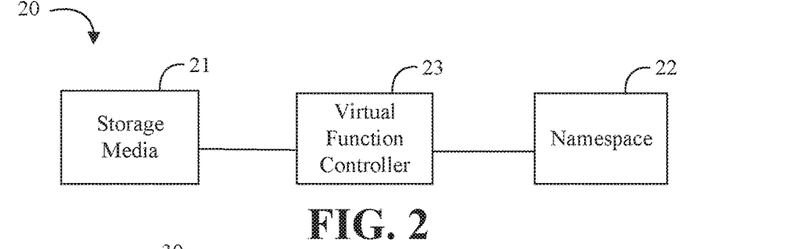
FIG. 2 is a block diagram of an example of a storage apparatus according to an embodiment.

Turning now to FIG. 2, an embodiment of a storage apparatus 20 may include persistent storage media 21, a namespace 22 having backend storage, and a virtual function controller 23 communicatively coupled to the persistent storage media 21 and the namespace 22 to assign the namespace 22 to a virtual storage function and to control access to the namespace 22 by the virtual storage function. Advantageously, the virtual function controller 23 may be further configured to cache access to the namespace 22 on the persistent storage media 21 and/or to maintain cache metadata on the persistent storage media 21. For example, the cache metadata may include a cache metadata table and the virtual function controller 23 may be further configured to compare an access request of the virtual storage function against information in the cache metadata table to determine if the access request can be fulfilled by data on the persistent storage media 21.

In some embodiments of the storage apparatus 20, the cache access to the namespace 22 on the persistent storage media 21 may advantageously be transparent to a guest operating system. The virtual function controller may additionally, or alternatively, be further configured to dynamically share the persistent storage media 21 for caching between the virtual storage function and one or more additional virtual storage functions. For example, the persistent storage media 21 may include a nonvolatile memory.

Embodiments of each of the above persistent storage media 21, namespace 22, virtual function controller 23, and other components of the storage apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, some operational aspects of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 3A:
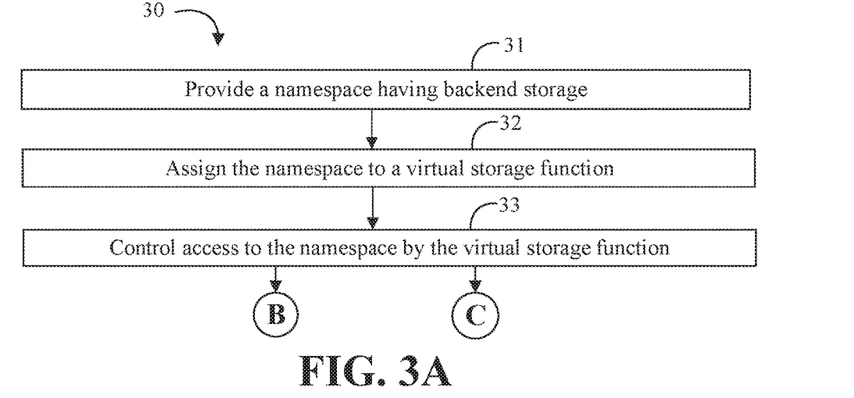
FIGS. 3A to 3C are flowcharts of an example of a method of managing virtual storage according to an embodiment.
Figure 3B:
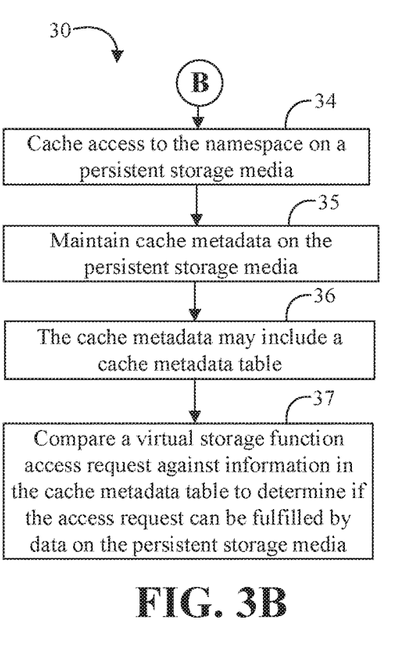
Figure 3C:
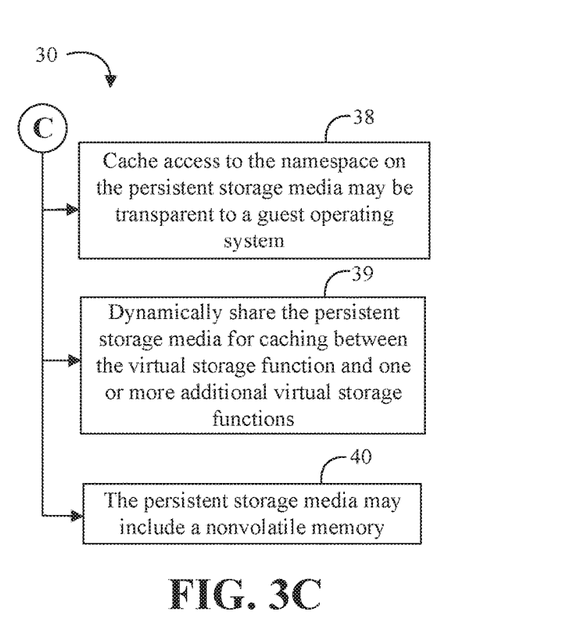

Turning now to FIG. 3, an embodiment of a method 30 of managing virtual storage may include providing a namespace having backend storage at block 31, assigning the namespace to a virtual storage function at block 32, and controlling access to the namespace by the virtual storage function at block 33. The method 30 may further include caching access to the namespace on a persistent storage media at block 34 and, for example, maintaining cache metadata on the persistent storage media at block 35. For example, the cache metadata may include a cache metadata table at block 36 and the method 30 may further include comparing a virtual storage function access request against information in the cache metadata table to determine if the access request can be fulfilled by data on the persistent storage media at block 37. Advantageously, caching access to the namespace on the persistent storage media may be transparent to a guest operating system at block 38. The method 30 may further include dynamically sharing the persistent storage media for caching between the virtual storage function and one or more additional virtual storage functions at block 39. For example, the persistent storage media may include a nonvolatile memory at block 40.

Embodiments of the method 30 may be implemented in an electronic processing system or a storage apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, embodiments of the method 30 may be implemented on a computer readable medium as described in connection with Examples 18 to 24 below.

Advantageously, some embodiments may provide a PCIe SRIOV compliant caching solid-state drive (SSD) for virtualized environments. Some embodiments may also provide a virtualized NVMe compliant software storage caching solution. Some embodiments may be suitable for use with byte addressable write-in-place non-volatile memory such as, INTEL 3DXPOINT technology, INTEL cache acceleration software (CAS), and in virtualized environments based on VIRTUAL MACHINE MANAGER (VMM, e.g. such as XEN, KVM, VMWARE, ESXI, etc.), or on LINUX CONTAINERS (LXC, e.g. docker).

Figure 4A:
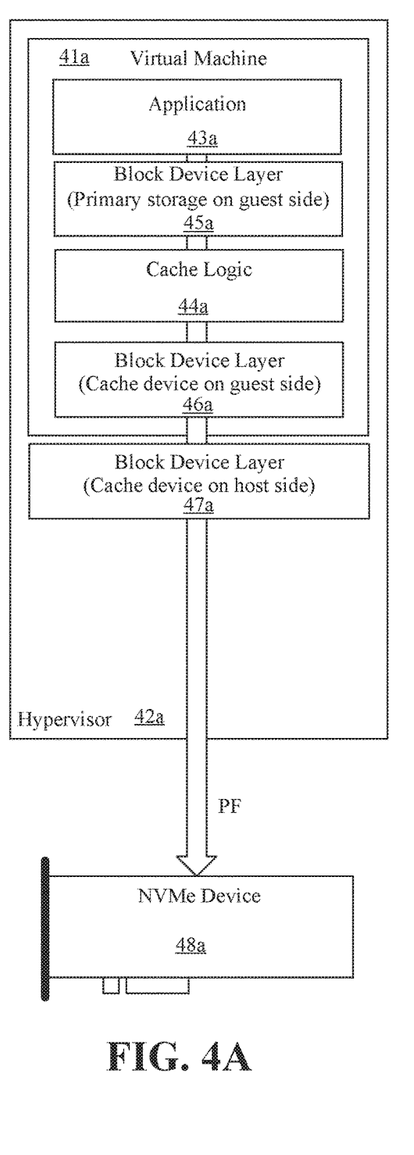
FIGS. 4A to 4C are block diagrams of alternative example approaches to caching in a virtualization environment.

Turning now to FIG. 4A, an example of caching in a guest operating system (OS) without direct access in a virtualization environment may include a virtual machine 41a running on a hypervisor 42a. An application 43a running on the virtual machine 41a may generate or receive an IO request which involves cache logic 44a which is also running on the virtual machine 41a. The IO path for the IO request may pass through three block device layers. First the IO may be processed by a first block device layer 45a of the virtual machine 41a (e.g. for primary storage on the guest side). Then the virtual machine 41a handles caching at a second block device layer 46a for the cache device on the guest side. And finally the IO is served on the hypervisor 42a by a third block device layer 47a of the cache device 48a (HIT) or backed storage (MISS), through a physical function (PF).

Some approaches of caching in a guest OS without direct access in a virtualization environment may have one or more the following problems or disadvantages: 1) the approach may consume guest (hypervisor) memory to maintain a cache metadata table; 2) the end user may not prefer to have a cache engine in guest OS because it may require installing additional caching software on the guest OS and additional maintenance; 3) the approach may involve relatively more difficult management by a datacenter infrastructure management service (e.g., applying policies, etc.); and/or 4) the approach may involve high IO latency and high CPU consumption (either for cache hit or cache miss) due to a heavy software stack (guest OS-hypervisor kernel path).

Figure 4B:
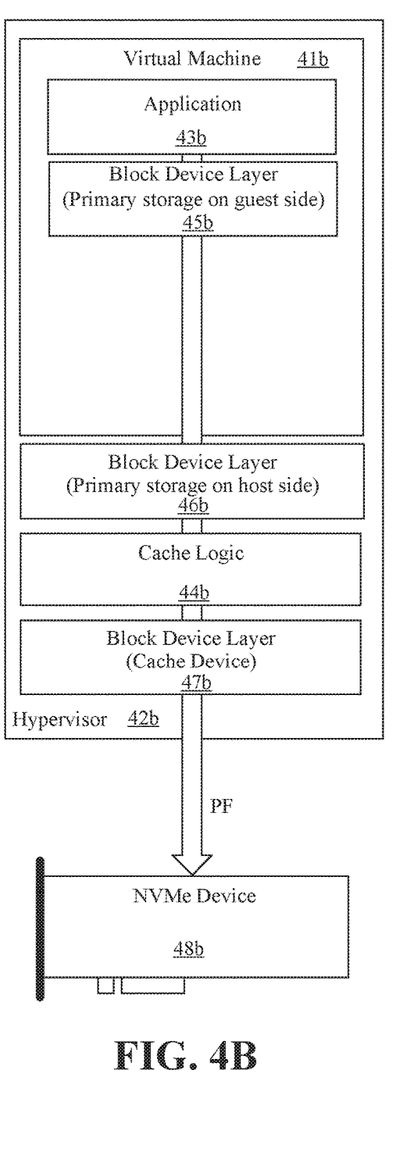

Turning now to FIG. 4B, an example of caching on a hypervisor side in a virtualization environment may include a virtual machine 41b running on a hypervisor 42b. An application 43b running on the virtual machine 41b may generate or receive an IO request which involves cache logic 44b which is also running on the virtual machine 41b. The IO path for the IO request may pass through three block device layers. First the IO is processed by a first block layer 45 of the virtual machine 41b. Then the hypervisor 42b handles IO and passes it to the cache logic 44b which is represented as a virtual block device layer 46b (second block layer). And finally the IO is served by third block device layer 47b of the cache device 48b (HIT) or backed storage (MISS), through a physical function (PF).

Some approaches of caching on a hypervisor side in a virtualization environment may have one or more of the following problems or disadvantages: 1) the approach may consume hypervisor memory to maintain a cache metadata table; and/or high IO latency and high CPU consumption (either for cache hit or cache miss) due to heavy software stack (guest OS→hypervisor kernel path).

Figure 4C:
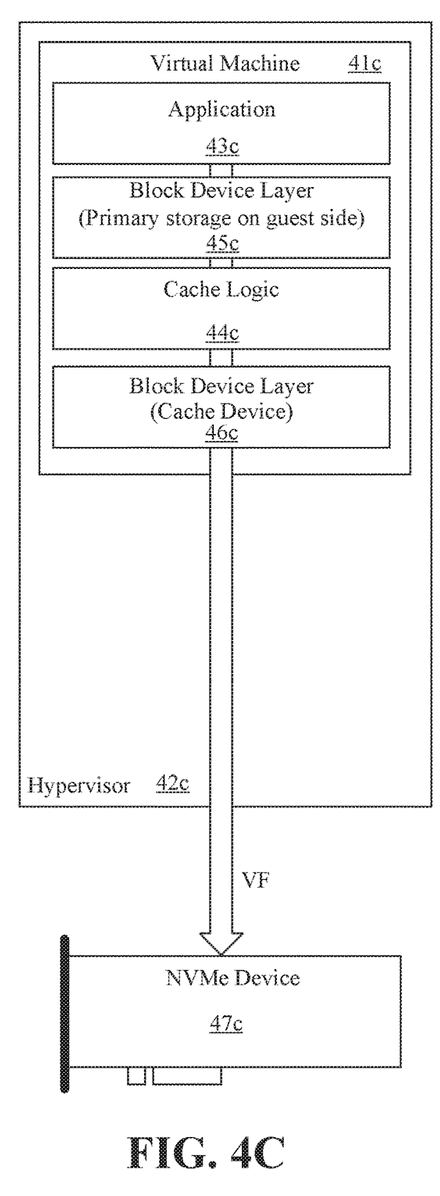

Turning now to FIG. 4C, an example of caching in a guest OS with SRIOV access in a virtualization environment may include a virtual machine 41c running on a hypervisor 42c. An application 43c running on the virtual machine 41a may generate or receive an IO request which involves cache logic 44c which is also running on the virtual machine 41c. The IO path for the IO request may pass through two block device layers, including a first block device layer 45c (e.g. for primary or backend storage on the guest side), and a second block device layer 46c on SRIOV for the cache device 47c (HIT) or back end storage block device (MISS). In addition, it requires installation of caching software on a guest OS.

Some approaches of caching in a guest OS with SRIOV access in a virtualization environment may have one or more of the following problems or disadvantages: 1) the approach may consume guest (hypervisor) memory to maintain a cache metadata table; 2) the approach may consume hypervisor CPU cycles; 3) the end user may not prefer to have a cache engine in guest OS because it may require installing additional caching software on the guest OS and additional maintenance; 4) the approach may involve relatively more difficult management by a datacenter infrastructure management service (e.g., applying policies, etc.); and/or 4) the approach may have issues when the guest OS crashes; some SRIOV approaches may involve a static allocation of an NVMe namespace to a particular VM which is not flexible when one VM is heavy loaded while another is not.

Figure 5:
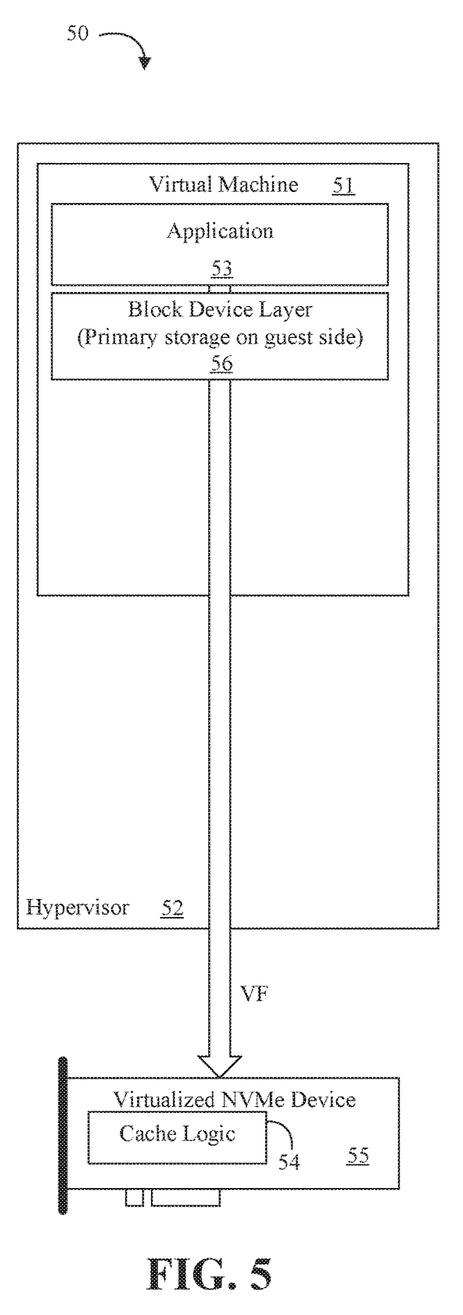
FIG. 5 is a block diagram of an example of caching for a virtualized environment according to an embodiment.

Turning now to FIG. 5, an example of caching in a virtualized environment 50 in accordance with an embodiment may include a virtual machine 51 running on a hypervisor 52. An application 53 running on the virtual machine 51 may generate or receive an IO request which involves cache logic 54 which may be advantageously running on a virtualized NVMe cache device 55. The IO path for the IO request may advantageously pass through a single block device layer 56. The cache device 55 may receive the IO request through a virtual function (VF) from the block device layer 56 (e.g. for primary or backend storage on the guest side).

Advantageously, some embodiments of the virtualized cache device 55 may provide one or more of the following benefits: 1) zero memory consumption on a hypervisor 52 side to maintain a cache metadata table; 2) substantially or totally transparent to the guest OS (e.g. the backend storage capacity may be seen as a namespace presented by the virtualized NVMe cache device 55 and assigned to the guest OS with an SRIOV virtual function); 3) little or no issues when the guest OS or hypervisor 52 crash (e.g. all cache data and metadata may be maintained by the virtualized NVMe cache device 55 itself); 4) dynamic sharing of NVMe capacity utilized for caching across all handled VMs (e.g. capacity management on a drive side); 5) relatively easier management by datacenter infrastructure management service (e.g. by using the physical function interface from the hypervisor 52); 6) low latency seen from the guest OS; high throughput seen from the guest OS; and/or 7) cache hit handling with performance close to the NVMe drive performance.

Without being limited to theory of operation, some of the caching approaches described in connection with FIG. 4A-C above may involve a relatively heavier storage stack (e.g. more levels) which may cause CPU consumption for IO processing, a higher latency software adder, and limited or no possibility to utilize some NVMe devices fully. For example, these problems may become more acute on some types of non-volatile memory devices (e.g. 3DXPOINT devices, or byte addressable write-in-place NVM) because the software latency adder may be bigger than the device latency. Advantageously, some embodiments may overcome some of these problems with a relatively lighter storage, freeing CPU resources for data processing, and provide a low latency cache for virtual machines.

Some embodiments may provide an NVMe device for virtualization which may be compliant with PCIe SRIOV specification and which may provide a storage cache for virtual machines. In some embodiments, NVMe namespaces with backend storage capacity may be assigned to virtual functions. For example, some embodiments may present the backend storage view by exposing to the host a virtual NVMe namespace and assign to it the PCIe virtual function (e.g. the virtual function interface may remain fully compatible with NVMe specification without any vendor specific commands). The interface presented on the virtual function may be regular without any modifications. This allows the VMs to use a regular storage stack without being aware about any caching layers. Cache functionality may be advantageously implemented on the NVMe side which may provide very low latency responses for a cache hit path. For a cache miss path there is processing involved on a hypervisor side, for which some embodiments of the NVMe device may provide an extended application programming interface (API) on a physical function interface. In some embodiments, all management of the NVMe device may advantageously be provided by a hypervisor software module via physical function or an out of band path.

For example, in some embodiments the namespace may report a one pebibyte (1 PiB, $2^{50}$) size which corresponds to the remote or local backend storage. The most used data (e.g. hot data) may be cached in the virtualized NVMe device's persistent memory. The rest of the data may be placed on the backend storage. In the case of a cache hit the request may be handled directly by the virtualized NVMe device. In the case of a cache miss the virtualized NVMe device may notify the hypervisor driver via a vendor specific command to send through the physical function. The hypervisor may forward the request to the backend storage. In this manner, a virtual machine may perform IO to the virtual NVMe namespace directly through an assigned virtual function. This functionality may be scalable to the number of available virtual functions.

IO throughput may be measured in terms of thousands of IO operations per second (kIOPs). Investigating storage performance of virtual machines for some approaches (e.g. those described in connection with FIGS. 4A-C), a performance bottleneck takes place and the virtual machine may saturate at about thirty (30) kIOPS. Under similar load, a virtualized NVMe device according to some embodiments may provide ten times (10×) better performance or more (e.g. more than about 400 kIOPS).

Figure 6:
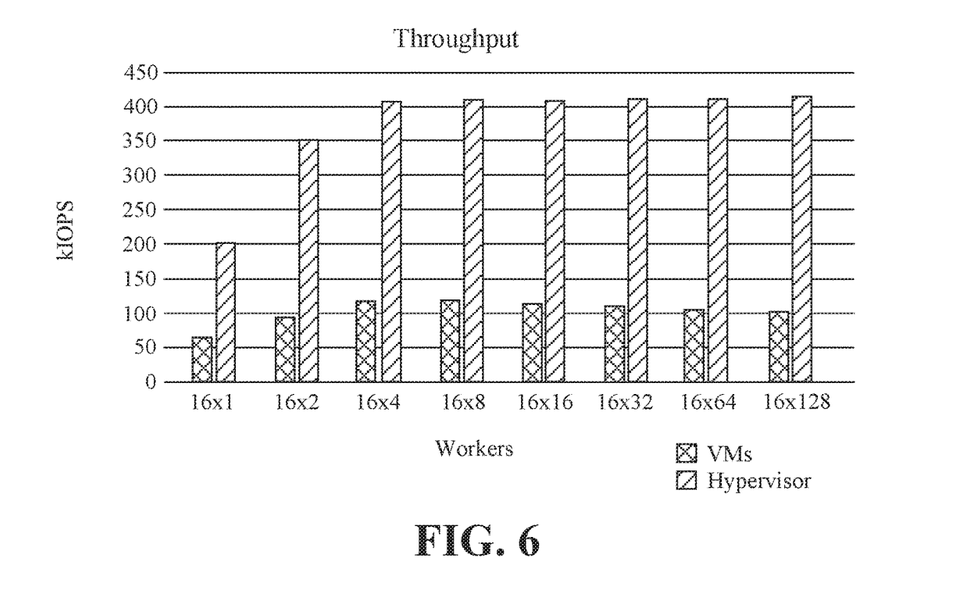
FIG. 6 is an example illustrative graph of throughput versus workers according to an embodiment.
Figure 7:
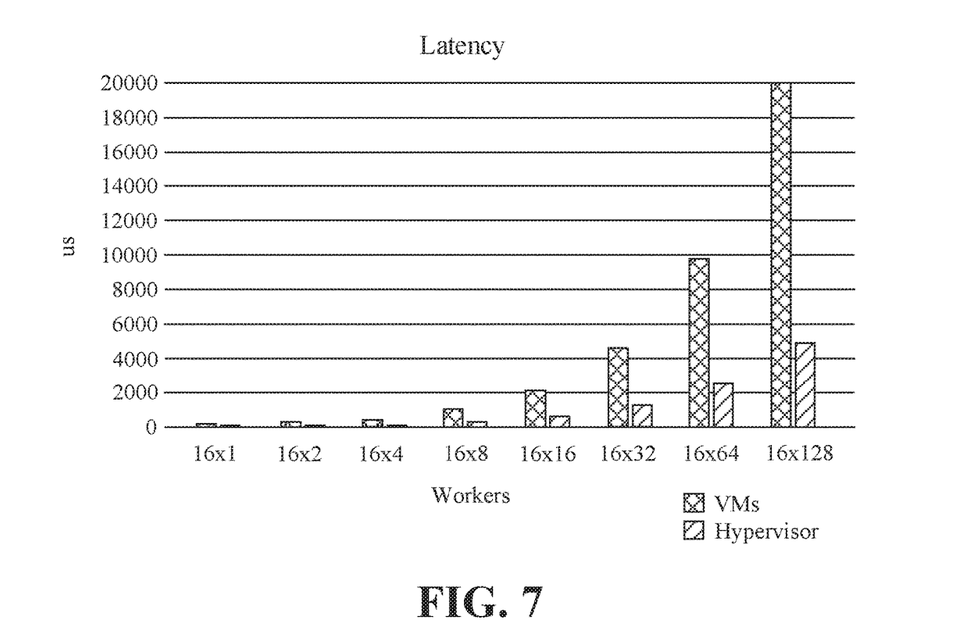
FIG. 7 is an example illustrative graph of latency versus workers according to an embodiment.
Figure 8:
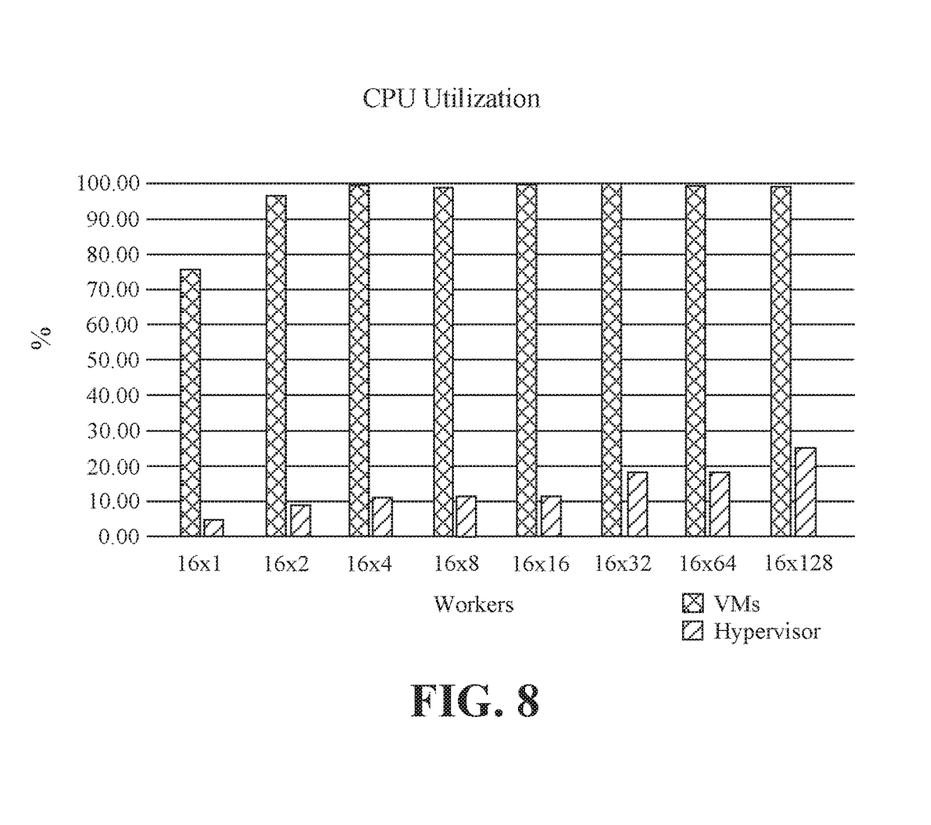
FIG. 8 is an example illustrative graph of central processor unit (CPU) utilization versus workers according to an embodiment.

Turning now to FIGS. 6 to 8, various illustrative performance graphs are based on an example system including a virtualized NVMe device based on an INTEL P3700 SSD, a CENTOS version 7.2 guest and hypervisor OS, and sixteen (16) VMs running on VIRTUALBOX. The performance was measured for a four (4) kibibyte (kiB, $2^{10}$) random read operation and a queue depth of one (1) for each worker. Sixteen (16) CPU cores were involved. Each of the graphs in FIGS. 6 to 8 show the performance as measured on the hypervisor side (e.g. approximately the virtualized NVMe device performance) and as measured on the 16 VMs. As shown in the graphs, the virtualized NVMe device in accordance with an embodiment may provide substantially the regular NVMe device performance from the VMs point of view, including low latency and high throughput, and low CPU utilization. Advantageously, the VMs' applications are able to do more computing and their performance may be higher.

Turning now to FIGS. 9-13, in accordance with some embodiments each virtual machine may perform IO using an assigned virtual function. An embodiment of an electronic processing system 90 may illustrate data flows of reads and writes in accordance with the embodiment. For simplification PCIe and virtualization layers may be omitted.

The below description, in connection with FIGS. 9-13, may be provided for one virtual machine. Similar behavior, however, may take place for multiple virtual machines in the system 90. The system 90 may include a hypervisor 91 communicatively coupled to a virtualized NVMe device 92 via a virtual function 93 and a physical function 94. The hypervisor 91 may be further communicatively coupled to a remote site 95. The remote site 95 may include backend storage 95a storing data 95b. The virtualized NVMe device 92 may include NVM 92a storing data 92b. The virtualized NVMe device 92 may further include a namespace 92c and a lookup table 92d coupled between the namespace 92c and the NVM 92a. The hypervisor 91 may include a virtual machine 91a communicatively coupled to the namespace 92c via the virtual function 93, and a namespace assistant 91b communicatively coupled to the lookup table 92d via the physical function 94. The namespace assistant may be further communicatively coupled to the backend storage 95a.

The virtualized NVMe device 92 may provide a cache engine for virtualization. In general, whenever the virtualized NVMe device 92 handles an IO request, a check may be performed to determine if any requested data are available in the NVM 92a. For example, this function may be implemented by the lookup table 92d (e.g. part of the cache engine). The cache content may be saved in cache metadata which may be located on RAM (e.g. NVRAM or DRAM) in the virtualized NVMe device 92 and/or the NVM 92a. In some embodiments, warm cache capabilities may be provided in the case of RAM metadata placement, where metadata is flushed on the device shutdown, and loaded on the device startup.

Figure 9:
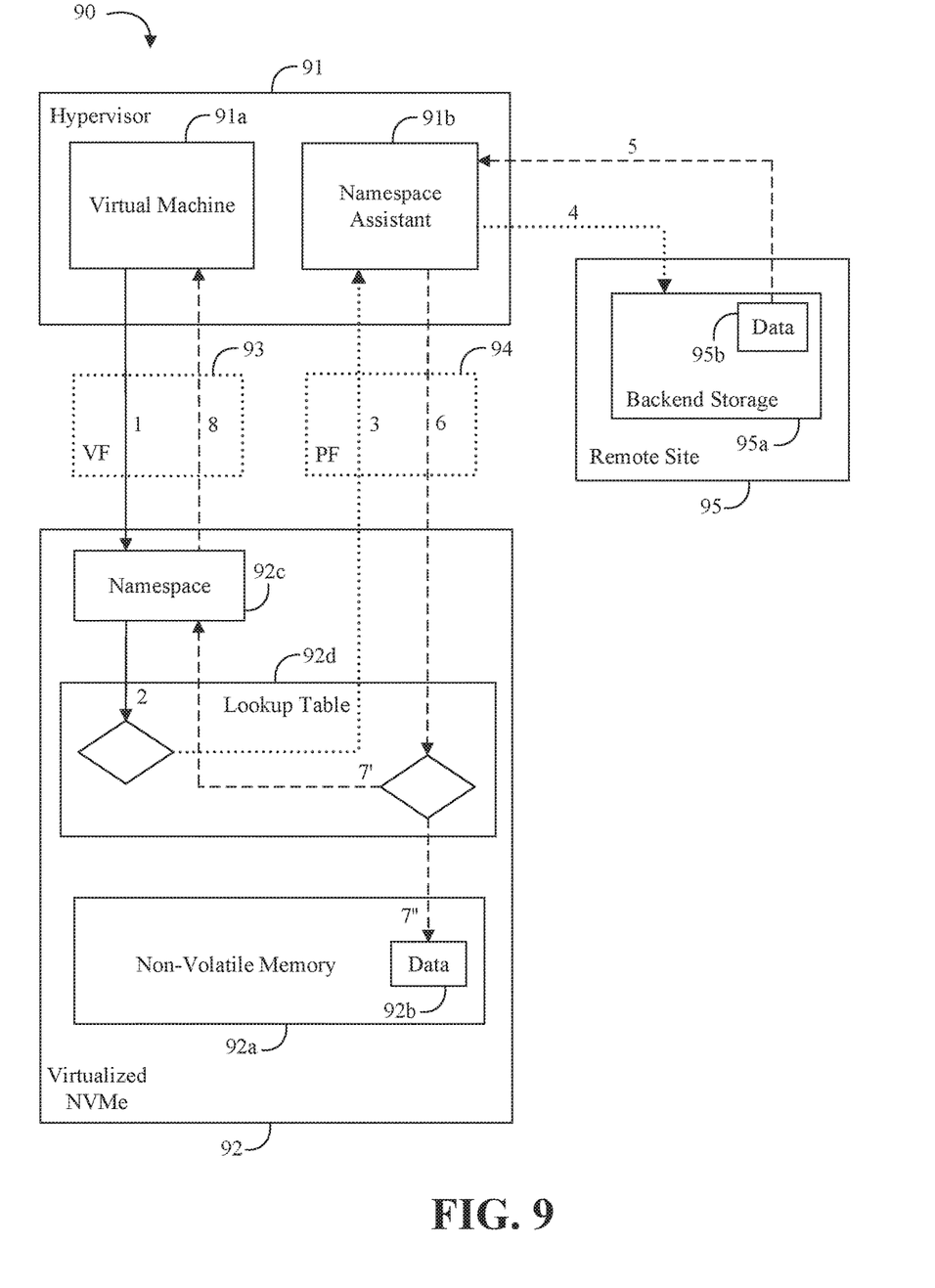
FIG. 9 is a block diagram of an example of an electronic processing system annotated with data flow information for an initial read operation according to an embodiment.

Turning now to FIG. 9, an example use case of a read in accordance with an embodiment is presented, when data is not initially available in the virtualized NVMe device's 92 NVM 92a (e.g. with numbered parentheticals (n) corresponding labels 1 to 8 on the drawing figure). The virtual machine 91a uses the VF to pass the read request to the appropriate namespace 92c (1). Then the IO is processed by the lookup table 92d located on the virtualized NVMe device 92 (2). The result is a miss, which means that data has to be fetched from the backend storage 95. On the hypervisor 91 side, the namespace assistant 91b (e.g. an operating system driver or module which handles vendor specific commands on a virtualized NVMe physical function related to caching) may be responsible for carriers IO requests from the namespace 92c to the backend storage (3). Communication between the assistant 91b and virtualized NVMe device 92 may be based on the physical function (PF). The namespace assistant 91b requests the data from the backend storage 95b (4) and receives the requested data in response to the request (5). Once data arrives from the backend storage, it is passed to the virtualized NVMe device 92 (6). Next, the lookup table 92d and namespace 92c may be updated (7'), the data may be written to the NVM 92a (7"), and the data is directed to the requester (virtual machine 91a) (8). In most embodiments, relatively low performance of cache miss (e.g. because IO needs to be forwarded to backend storage by SSD PF-hypervisor path) may not be an issue because cache misses are against a relatively slow backend device anyway (e.g. remote iSCSI resources or even local HDDs/SSDs with no support for SRIOV).

Figure 10:
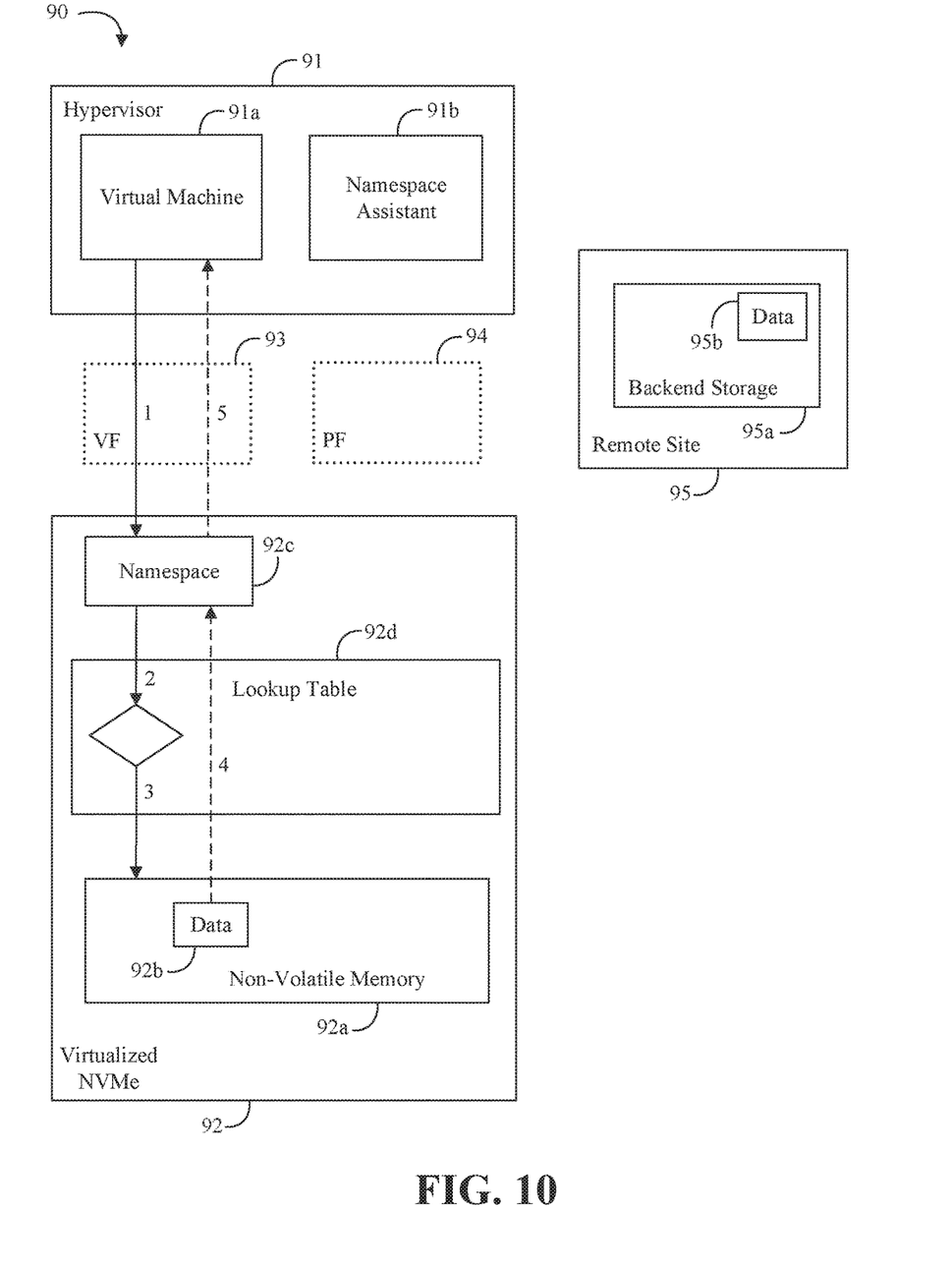
FIG. 10 is a block diagram of an example of an electronic processing system annotated with data flow information for a successive read operation according to an embodiment.

Turning now to FIG. 10, an example use case for a successive read according to an embodiment is presented, for accessing already cached data. The virtual machine 91a uses the VF to pass the read request to the appropriate namespace 92c (1). Then the IO is processed by the lookup table 92d located on the virtualized NVMe device 92 (2). The lookup of the data results in a hit. Data is fetched from the NVM 92a (3), the namespace 92C is updated (3), and the data is returned to the virtual machine 91a using the virtual function (4). The backend storage 95a may not be engaged.

Figure 11:
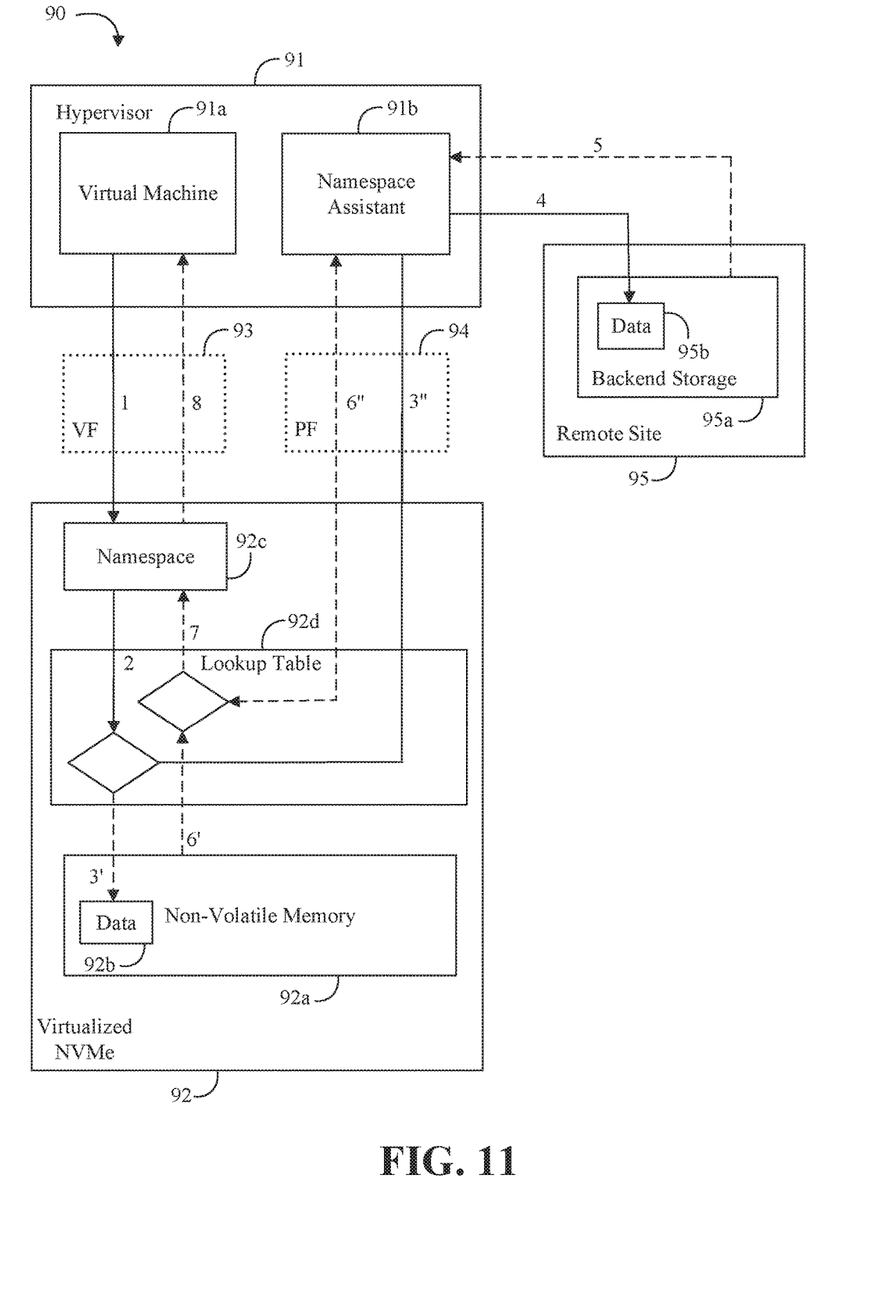
FIG. 11 is a block diagram of an example of an electronic processing system annotated with data flow information for a write through operation according to an embodiment.

Turning now to FIG. 11, an example use case for a cache policy write through use case according to an embodiment is presented. For example, a cache policy write through may mean that data has to be updated on the backend storage 95a and cached in the NVM 92a. The virtual machine 91a may perform the write IO to the namespace 92c using the virtual function 93 (1). Next the data may be inserted in the NVM 92a (2, 3'). A second path may be sending out data to the namespace assistant 91b (3") to update the backend storage 95a (4, 5). The namespace assistant 91b may use the PF to receive data from the virtualized NVMe device 92 and send it to the remote site 95. Finally, the write results may be merged (6', 6") and passed back to the virtual machine 91a (7, 8).

Figure 12:
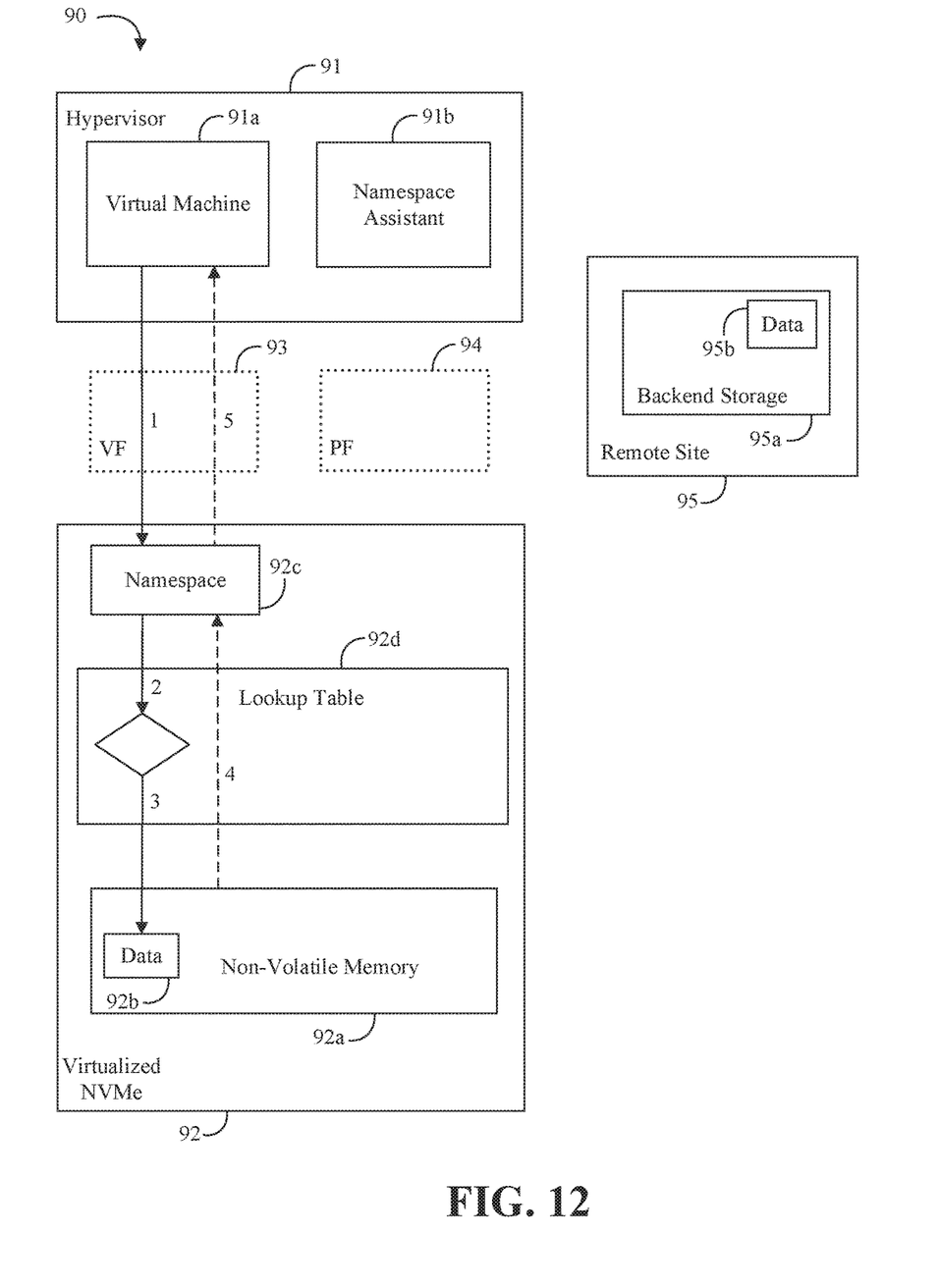
FIG. 12 is a block diagram of an example of an electronic processing system annotated with data flow information for a write back operation according to an embodiment.

Turning now to FIG. 12, an example use case for a cache policy write back according to an embodiment is presented. For this case, a write request is considered to be completed when data is placed in the NVM 92a only (e.g. no write to the backend storage 95a). The virtual machine 91a may perform the write IO to the virtualized NVMe device's 92 NVM 92a only (1, 2, 3). The backend storage 95a path may not be engaged. As a consequence, there may be no synchronization between the cache and the backend storage 95a. For example, unsynchronized data may be referred to as dirty and may need to be cleaned in the background.

Figure 13:
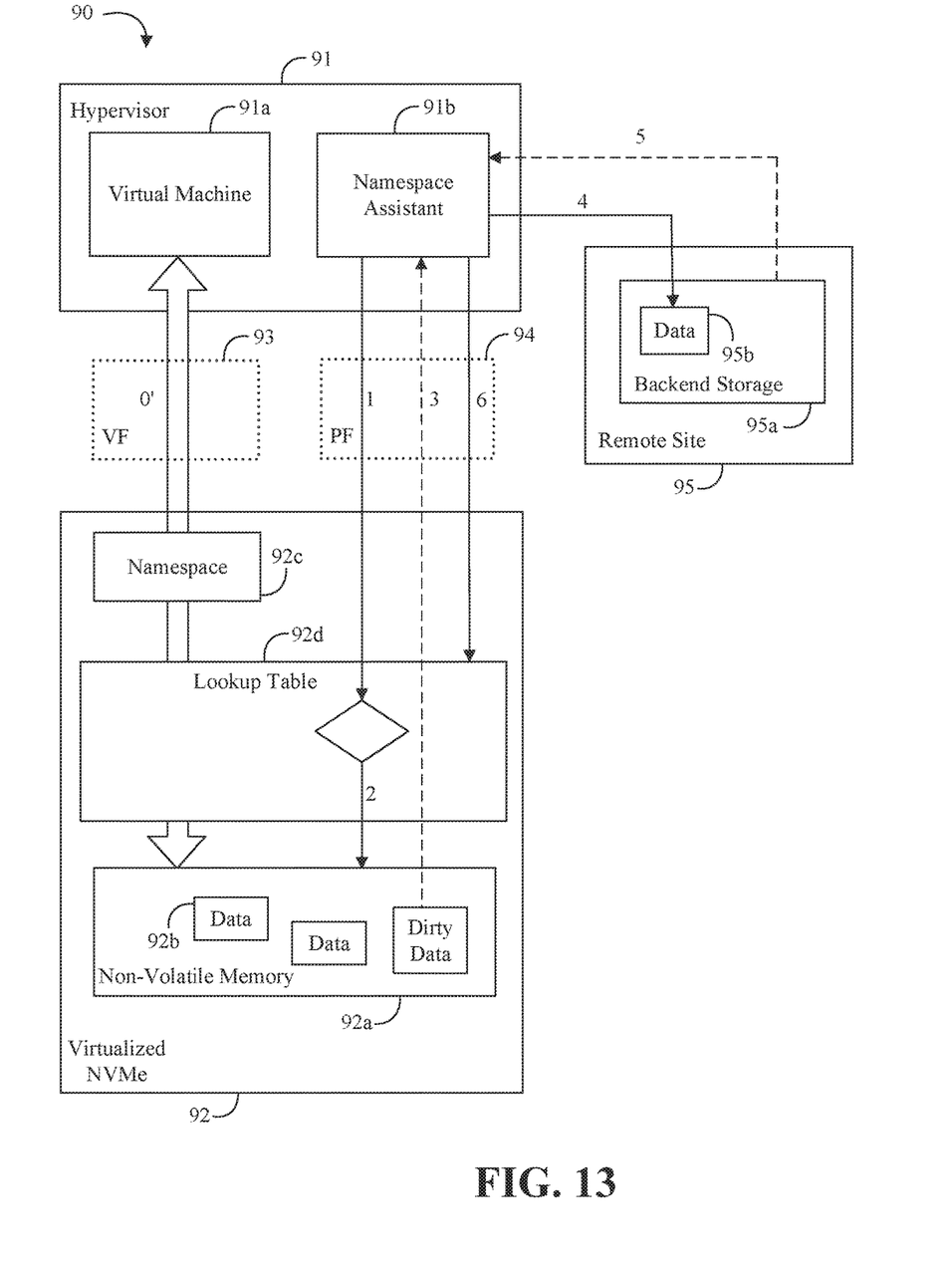
FIG. 13 is a block diagram of an example of an electronic processing system annotated with data flow information for a cleaning operation according to an embodiment.

Turning now to FIG. 13, an example use case for cleaning according to an embodiment is presented. For example, a background activity which synchronizes dirty data with the backend storage 95a may be called cleaning. During cleaning the virtual machine 91a may be able to perform IOs without any disruptions. The cleaning process may be triggered by the namespace assistant 91b which asks for dirty data (1, 2). In addition, or alternatively, the cleaning process may be triggered by the cache engine handling metadata located on a drive in case of passing some conditions (e.g. cache capacity utilization higher than x %) (0'). The dirty data may be fetched from the nonvolatile memory (3), written to the backend storage (4, 5), and on success may be marked as a clean (6).

Additional Notes and Examples

Example 1 may include an electronic processing system, comprising a host device to host one or more virtual machines with one or more virtual storage functions respectively assigned to the one or more virtual machines, an input/output (IO) interface communicatively coupled to the host device to manage IO for the one or more virtual machines, a storage device communicatively coupled to the IO interface, the storage device including persistent storage media, one or more namespaces having backend storage, and one or more virtual function controllers communicatively coupled to the persistent storage media and the one or more namespaces to respectively assign the one or more namespaces to the one or more virtual storage functions and to control access to the namespaces by the virtual storage functions, and a remote storage system to provide the backend storage for the one or more namespaces.

Example 2 may include the electronic processing system of Example 1, wherein the persistent storage media comprises nonvolatile memory.

Example 3 may include the electronic processing system of any of Examples 1 to 2, wherein the one or more virtual function controllers are further to provide a cache engine to cache access to the one or more namespaces on the persistent storage media.

Example 4 may include a storage apparatus, comprising persistent storage media, a namespace having backend storage, and a virtual function controller communicatively coupled to the persistent storage media and the namespace to assign the namespace to a virtual storage function and to control access to the namespace by the virtual storage function.

Example 5 may include the storage apparatus of Example 4, wherein the virtual function controller is further to cache access to the namespace on the persistent storage media.

Example 6 may include the storage apparatus of Example 5, wherein the virtual function controller is further to maintain cache metadata on the persistent storage media.

Example 7 may include the storage apparatus of Example 6, wherein the cache metadata comprises a cache metadata table, and wherein the virtual function controller is further to compare an access request of the virtual storage function against information in the cache metadata table to determine if the access request can be fulfilled by data on the persistent storage media.

Example 8 may include the storage apparatus of any of Examples 5 to 7, wherein the cache access to the namespace on the persistent storage media is transparent to a guest operating system.

Example 9 may include the storage apparatus of any of Examples 5 to 7, wherein the virtual function controller is further to dynamically share the persistent storage media for caching between the virtual storage function and one or more additional virtual storage functions.

Example 10 may include the storage apparatus of any of Examples 5 to 7, wherein the persistent storage media comprises a nonvolatile memory.

Example 11 may include a method of managing virtual storage, comprising providing a namespace having backend storage, assigning the namespace to a virtual storage function, and controlling access to the namespace by the virtual storage function.

Example 12 may include the method of Example 11, further comprising caching access to the namespace on a persistent storage media.

Example 13 may include the method of Example 12, further comprising maintaining cache metadata on the persistent storage media.

Example 14 may include the method of Example 13, wherein the cache metadata comprises a cache metadata table, the method further comprising comparing a virtual storage function access request against information in the cache metadata table to determine if the access request can be fulfilled by data on the persistent storage media.

Example 15 may include the method of any of Examples 12 to 14, wherein caching access to the namespace on the persistent storage media is transparent to a guest operating system.

Example 16 may include the method of any of Examples 12 to 14, further comprising dynamically sharing the persistent storage media for caching between the virtual storage function and one or more additional virtual storage functions.

Example 17 may include the method of any of Examples 12 to 14, wherein the persistent storage media comprises a nonvolatile memory.

Example 18 may include at least one computer readable medium, comprising a set of instructions, which when executed by a computing device, cause the computing device to provide a namespace having backend storage, assign the namespace to a virtual storage function, and control access to the namespace by the virtual storage function.

Example 19 may include the at least one computer readable medium of Example 18, comprising a further set of instructions, which when executed by a computing device, cause the computing device to cache access to the namespace on a persistent storage media.

Example 20 may include the at least one computer readable medium of Example 19, comprising a further set of instructions, which when executed by a computing device, cause the computing device to maintain cache metadata on the persistent storage media.

Example 21 may include the at least one computer readable medium of Example 19, comprising a further set of instructions, which when executed by a computing device, cause the computing device to maintain a cache metadata table on the persistent storage media, and compare a virtual storage function access request against information in the cache metadata table to determine if the access request can be fulfilled by data on the persistent storage media.

Example 22 may include the at least one computer readable medium of any of Examples 19 to 21, wherein the cache access to the namespace on the persistent storage media is transparent to a guest operating system.

Example 23 may include the at least one computer readable medium of any of Examples 19 to 21, comprising a further set of instructions, which when executed by a computing device, cause the computing device to dynamically share the persistent storage media for caching between the virtual storage function and one or more additional virtual storage functions.

Example 24 may include the at least one computer readable medium of any of Examples 19 to 21, wherein the persistent storage media comprises a nonvolatile memory.

Example 25 may include a storage apparatus, comprising means for providing a namespace having backend storage, means for assigning the namespace to a virtual storage function, and means for controlling access to the namespace by the virtual storage function.

Example 26 may include the storage apparatus of Example 25, further comprising means for caching access to the namespace on a persistent storage media.

Example 27 may include the storage apparatus of Example 26, further comprising means for maintaining cache metadata on the persistent storage media.

Example 28 may include the storage apparatus of Example 27, wherein the cache metadata comprises a cache metadata table, further comprising means for comparing a virtual storage function access request against information in the cache metadata table to determine if the access request can be fulfilled by data on the persistent storage media.

Example 29 may include the storage apparatus of any of Examples 26 to 28, wherein the means for caching access to the namespace on the persistent storage media is transparent to a guest operating system.

Example 30 may include the storage apparatus of any of Examples 26 to 28, further comprising means for dynamically sharing the persistent storage media for caching between the virtual storage function and one or more additional virtual storage functions.

Example 31 may include the storage apparatus of any of Examples 26 to 28, wherein the persistent storage media comprises a nonvolatile memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodi-

We claim:

1. A storage apparatus, comprising:
   persistent storage media;
   a namespace, wherein the namespace is associated with a backend storage; and
   a virtual function controller communicatively coupled to the persistent storage media and the namespace to assign the namespace to a virtual storage function, which is to communicatively couple the namespace and a virtual machine, and to control access to the namespace by the virtual storage function, wherein an input/output (I/O) request from the virtual machine is to be received by the namespace through the virtual storage function, wherein after the I/O request is received by the namespace, the virtual function controller is further to:
      determine if an access request of the I/O request can be fulfilled by data on the persistent storage media, and
      determine that data is to be retrieved from the backend storage when the virtual function controller determines that the access request cannot be fulfilled by the data on the persistent storage media.

2. The storage apparatus of claim 1, wherein the virtual function controller is further to:
   cache access to the namespace on the persistent storage media.

3. The storage apparatus of claim 2, wherein the virtual function controller is further to:
   maintain cache metadata on the persistent storage media.

4. The storage apparatus of claim 3, wherein the cache metadata comprises a cache metadata table, and wherein the virtual function controller is further to:
   after the I/O request is passed to the namespace through the virtual storage function, identify the I/O request as the access request, and compare the access request against information in the cache metadata table to determine if the access request can be fulfilled by the data on the persistent storage media; and
   if the access request cannot be fulfilled by the data on the persistent storage media, store data from the backend storage onto the persistent storage media.

5. The storage apparatus of claim 2, wherein the cache access to the namespace on the persistent storage media is transparent to a guest operating system.

6. The storage apparatus of claim 2, wherein the virtual function controller is further to:
   dynamically share the persistent storage media for caching between the virtual storage function and one or more additional virtual storage functions.

7. The storage apparatus of claim 2, wherein the persistent storage media comprises a nonvolatile memory.

8. The storage apparatus of claim 1, wherein the virtual function controller is further to retrieve data from the backend storage when the virtual function controller determines that the access request cannot be fulfilled by the data on the persistent storage media.

9. A storage apparatus, comprising:
   a virtual function controller, implemented at least partly in one or more of configurable logic or fixed-functionality logic hardware, communicatively coupled to a persistent storage media and a namespace to assign the namespace to a virtual storage function, which is to communicatively couple the namespace and a virtual machine, and to control access to the namespace by the virtual storage function, wherein the namespace is associated with a backend storage and the persistent storage media, wherein an input/output (I/O) request from the virtual machine is to be received by the namespace through the virtual storage function, wherein after the I/O request is received by the namespace, the virtual function controller is further to:
      determine if an access request of the I/O request can be fulfilled by data on the persistent storage media, and
      determine that data is to be retrieved from the backend storage when the virtual function controller determines that the access request cannot be fulfilled by the data on the persistent storage media.

10. The storage apparatus of claim 9, wherein the virtual function controller is further to retrieve data from the backend storage when the virtual function controller determines that the access request cannot be fulfilled by the data on the persistent storage media.

11. A method of managing virtual storage, comprising:
    providing a namespace, wherein the namespace is associated with a backend storage;
    assigning the namespace to a virtual storage function that communicatively couples the namespace and a virtual machine;
    controlling access to the namespace by the virtual storage function;
    receiving, at the namespace, an input/output (I/O) request from the virtual machine through the virtual storage function; and
    after the I/O request is received by the namespace,
       determining if an access request of the I/O request can be fulfilled by data on a persistent storage media, and
       determining that data is to be retrieved from the backend storage when the access request cannot be fulfilled by the data on the persistent storage media.

12. The method of claim 11, further comprising:
    caching access to the namespace on the persistent storage media.

13. The method of claim 12, further comprising:
    maintaining cache metadata on the persistent storage media.

14. The method of claim 13, wherein the cache metadata comprises a cache metadata table, the method further comprising:
    after the I/O request is passed to the namespace through the virtual storage function, identifying the I/O request as the access request, and comparing the access request against information in the cache metadata table to determine if the access request can be fulfilled by the data on the persistent storage media; and
    if the access request cannot be fulfilled by the data on the persistent storage media, storing data from the backend storage onto the persistent storage media.

15. The method of claim 12, wherein caching access to the namespace on the persistent storage media is transparent to a guest operating system.

16. The method of claim 12, further comprising:
    dynamically sharing the persistent storage media for caching between the virtual storage function and one or more additional virtual storage functions.

17. The method of claim 12, wherein the persistent storage media comprises a nonvolatile memory.

18. The method of claim 11, further comprising retrieving data from the backend storage when the access request cannot be fulfilled by the data on the persistent storage media.

* * * * *